United States Patent
Oyobe et al.

(10) Patent No.: US 7,898,103 B2
(45) Date of Patent: Mar. 1, 2011

(54) POWER SUPPLY APPARATUS FOR VEHICLE AND VEHICLE INCORPORATING THE SAME

(75) Inventors: Hichirosai Oyobe, Toyota (JP); Wanleng Ang, Toyota (JP); Hiroshi Yoshida, Anjo (JP); Hiroki Sawada, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 307 days.

(21) Appl. No.: 12/227,218

(22) PCT Filed: May 30, 2007

(86) PCT No.: PCT/JP2007/061411
§ 371 (c)(1),
(2), (4) Date: Nov. 12, 2008

(87) PCT Pub. No.: WO2007/148531
PCT Pub. Date: Dec. 27, 2007

(65) Prior Publication Data
US 2010/0164278 A1     Jul. 1, 2010

(30) Foreign Application Priority Data
Jun. 23, 2006   (JP) .................................. 2006-174118

(51) Int. Cl.
*H02J 7/00* (2006.01)

(52) U.S. Cl. ........................................ 307/9.1; 307/10.1

(58) Field of Classification Search .................. 307/9.1, 307/10.1
See application file for complete search history.

(56) References Cited

U.S. PATENT DOCUMENTS

| | | | |
|---|---|---|---|
| 5,710,699 A * | 1/1998 | King et al. | 363/132 |
| 6,917,179 B2 * | 7/2005 | Komatsu et al. | 318/700 |
| 7,212,891 B2 * | 5/2007 | Sato | 701/22 |
| 2003/0107352 A1 | 6/2003 | Downer et al. | |
| 2005/0047175 A1 | 3/2005 | Kawasaki et al. | |

FOREIGN PATENT DOCUMENTS

| | | |
|---|---|---|
| JP | A-06-351160 | 12/1994 |
| JP | A-08-256404 | 10/1996 |
| JP | A-2002-010502 | 1/2002 |
| JP | A-2003-209969 | 7/2003 |
| JP | A-2005-051994 | 2/2005 |
| JP | A-2006-158173 | 6/2006 |

* cited by examiner

Primary Examiner — Jared J Fureman
Assistant Examiner — Dru M Parries
(74) Attorney, Agent, or Firm — Oliff & Berridge, PLC

(57) ABSTRACT

A power supply apparatus for a vehicle includes first and second batteries, a power supply line, first and second boost converters, a system main relay, a capacitor, and a control device controlling the first and second boost converters and a connecting portion. Upon receiving a startup instruction IGON, the control device controls the first boost converter such that a feeding node capacitor is charged from the first battery, and controls the second boost converter such that the capacitor is charged from the power supply line. After the charging of the capacitor is completed, the control device switches the system main relay from a disconnected state to a connected state.

12 Claims, 8 Drawing Sheets

POWER SUPPLY APPARATUS FOR VEHICLE AND VEHICLE INCORPORATING THE SAME

TECHNICAL FIELD

The present invention relates to a power supply apparatus for a vehicle and a vehicle incorporating the same, and more particularly, to a power supply apparatus including a plurality of power storage devices.

BACKGROUND ART

Japanese Patent Laying-Open No. 2002-10502 discloses a charging and discharging device for storage batteries that charges and discharges a plurality of storage batteries simultaneously. This charging and discharging device for storage batteries includes a rectifying circuit for charging that rectifies an alternating current (AC) power supply, a rectifying circuit for regeneration that is in antiparallel to this rectifying circuit for charging and regenerates the amount of electricity of the storage batteries to the AC power supply, a step-up/down converter having a switching element that is at an output of the rectifying circuit for charging and controls an output, a smoothing capacitor smoothing an output of the step-up/down converter, a first voltage detector detecting a voltage across the smoothing capacitor, and a second voltage detector detecting a storage battery voltage of the storage batteries. The step-up/down converter is controlled such that a detection signal of the first voltage detector becomes a detection signal of the second voltage detector.

By thus controlling the step-up/down converter, the provision of a current-limiting resistor of a large capacity that limits an inrush current at the start of discharging and also a current-limiting resistor as well as opening and closing means is no longer required.

In recent years, electric vehicles whose wheels are driven by a motor, fuel cell vehicles and hybrid vehicles powered by both a motor and an engine have received attention as environmentally-friendly vehicles. In these vehicles, a voltage source such as a storage battery is stepped up by a step-up/down converter and the stepped up voltage is supplied to an inverter for driving a motor.

Furthermore, in these vehicles, it is considered to mount a plurality of power storage devices in order to realize both fuel efficiency and dynamics as well as to extend the distance traveled by the vehicles without being refueled. In a power supply apparatus for a vehicle, where the plurality of power storage devices are mounted, a current-limiting resistor of a large capacity that limits an inrush current at the start of discharging also needs to be provided. Furthermore, a current-limiting resistor as well as opening and closing means also need to be provided for each power storage device.

The above-described Japanese Patent Laying-Open No. 2002-10502 is directed to a device connected to a three-phase AC power supply that is a commercial power supply, and relates to a device that carries out a charging and discharging test of the storage batteries. Since energy is supplied from the three-phase AC power supply that is a commercial power supply capable of supplying electric power as needed to a step-up converter, the step-up/down converter can be readily controlled in order to reduce a voltage difference at the time of discharging before the step-up converter is connected to the storage batteries.

In the vehicle when a power supply system stops (in the case of a hybrid vehicle, when an engine also stops), however, a relay is opened and the power storage device is separated from the step-up/down converter. Here, since there is no other voltage source at the step-up/down converter, additional measures are required to operate the step-up/down converter. In other words, the technology for the charging and discharging test device using the commercial power supply is not applicable to the power supply apparatus for a vehicle as it is.

DISCLOSURE OF THE INVENTION

An object of the present invention is to provide a power supply apparatus for a vehicle that can employ a plurality of power storage devices with a simple configuration, and a vehicle including the same.

In summary, the present invention is directed to a power supply apparatus for a vehicle including a first power storage device, a power supply line for feeding an inverter that drives a motor, a first voltage converter provided between the first power storage device and the power supply line for converting a voltage, a second power storage device, a second voltage converter provided between the second power storage device and the power supply line for converting a voltage, a connecting portion provided between the second power storage device and the second voltage converter for switching between an electrically connected state and a disconnected state, a capacitor coupled to a path connecting the connecting portion and the second voltage converter, and a control device controlling the first and second voltage converters and the connecting portion. Upon receiving a startup instruction, the control device controls the first voltage converter such that electric power is supplied from the first power storage device to the power supply line, and controls the second voltage converter such that the capacitor is charged from the power supply line. After charging of the capacitor is completed, the control device switches the connecting portion from the disconnected state to the connected state.

Preferably, the power supply apparatus for a vehicle further includes a sensor sensing a state of charge of the capacitor. The control device determines whether charging of the capacitor is completed according to an output of the sensor.

Preferably, the power supply apparatus for a vehicle further includes a first voltage sensor sensing a voltage of the second power storage device, and a second voltage sensor sensing a charging voltage of the capacitor. The control device receives outputs of the first and second voltage sensors and prohibits switching of the connecting portion to a connected state while a difference between a voltage of the second power storage device and a charging voltage of the capacitor is higher than a prescribed value.

Preferably, the power supply apparatus for a vehicle further includes a first relay provided between the first power storage device and the first voltage converter, a current-limiting element connected in series to the first relay, and a second relay provided in parallel to the first relay and the current-limiting element that are connected in series. The connecting portion includes a third relay. Upon receiving the startup instruction, the control device causes the first relay to be brought into conduction and the capacitor to be charged, and then switches the second and third relays from a non-conducting state to a conducting state.

Preferably, the power supply apparatus for a vehicle further includes a first positive relay provided between a positive electrode of the first power storage device and the first voltage converter, a current-limiting element connected in series to the first positive relay, a second positive relay provided in parallel to the first positive relay and the current-limiting element that are connected in series, and a first negative relay provided between a negative electrode of the first power storage device and the first voltage converter. The connecting portion includes the third positive relay provided between a positive electrode of the second power storage device and the second voltage converter, and a second negative relay provided between a negative electrode of the second power storage device and the second voltage converter.

Preferably, the power supply apparatus further includes a negative line to which a negative electrode of the first power storage device and a negative electrode of the second power storage device are both connected, a ground line to which the first voltage converter and the second voltage converter are both connected, a negative relay provided between the negative line and the ground line, a first positive relay provided between a positive electrode of the first power storage device and the first voltage converter, a current-limiting element connected in series to the first positive relay, and a second positive relay provided in parallel to the first positive relay and the current-limiting element that are connected in series. The connecting portion includes the third positive relay provided between a positive electrode of the second power storage device and the second voltage converter.

In another aspect, the present invention is directed to a vehicle incorporating any of the above-described power supply apparatuses.

According to the present invention, a power supply apparatus for a vehicle incorporating a plurality of power storage devices can be realized without complicating a configuration.

BEST MODES FOR CARRYING OUT THE INVENTION

Figure 1:
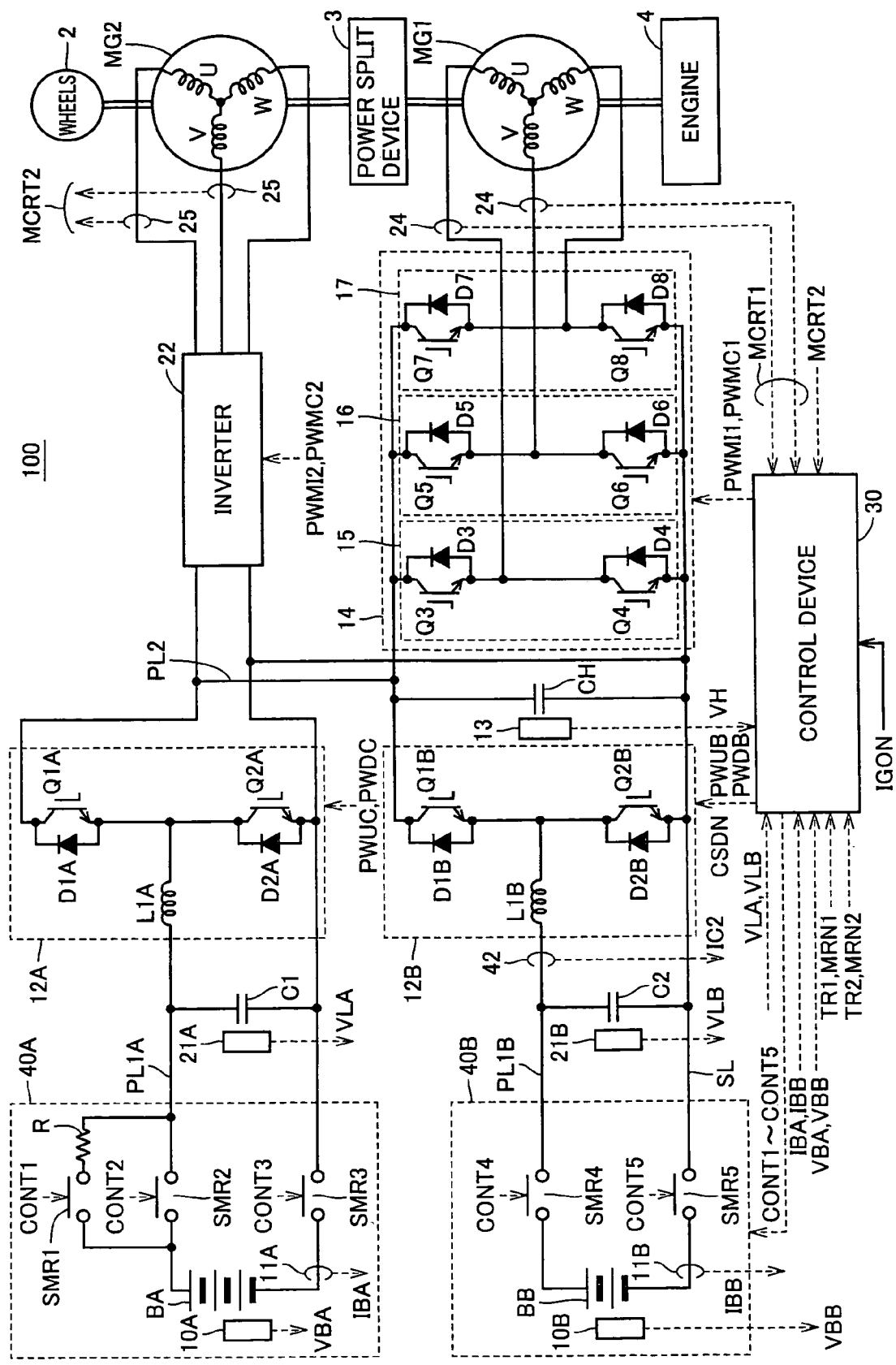
FIG. 1 is a circuit diagram of a configuration of a vehicle 100 incorporating two types of batteries having different properties as power storage devices.

The embodiments of the present invention will be described in detail hereinafter with reference to the drawings, where the same or corresponding parts are represented by the same reference numerals, and the description thereof will not be repeated.

First Embodiment

FIG. 1 is a circuit diagram of a configuration of a vehicle 100 incorporating two types of batteries having different properties as power storage devices.

Referring to FIG. 1, vehicle 100 includes battery units 40A and 40B, boost converters 12A and 12B, smoothing capacitors C1 and C2, voltage sensors 13, 21A and 21B, inverters 14 and 22, an engine 4, motor generators MG1 and MG2, a power split device 3, wheels 2, and a control device 30.

Smoothing capacitor C1 is connected between a power supply line PL1A and a ground line SL. Voltage sensor 21A senses a voltage VLA across smoothing capacitor C1 and outputs the sensed voltage to control device 30. Boost converter 12A boosts a voltage between the terminals of smoothing capacitor C1.

Smoothing capacitor C2 is connected between a power supply line PL1B and ground line SL. Voltage sensor 21B senses a voltage VLB across smoothing capacitor C2 and outputs the sensed voltage to control device 30. Boost converter 12B boosts a voltage between the terminals of smoothing capacitor C2.

A smoothing capacitor CH smoothes the voltage boosted by boost converters 12A and 12B. Voltage sensor 13 senses a voltage VH between the terminals of smoothing capacitor CH and outputs the sensed voltage to control device 30.

Inverter 14 converts a direct current (DC) voltage provided from boost converter 12B or 12A into a three-phase AC and outputs the converted AC to motor generator MG1. Inverter 22 converts a DC voltage provided from boost converter 12B or 12A into a three-phase AC and outputs the converted AC to motor generator MG2.

Power split device 3 is a device that is coupled to engine 4 and motor generators MG1 and MG2 to distribute motive power therebetween. For example, a planetary gear mechanism having three rotation shafts of a sun gear, a planetary carrier and a ring gear can be used as the power split device. These three rotation shafts are connected to rotation shafts of engine 4 and motor generators MG1 and MG2, respectively. It should be noted that the rotation shaft of motor generator MG2 is coupled to wheels 2 through a reduction gear and a differential gear that are not shown. A decelerator for the rotation shaft of motor generator MG2 may further be incorporated into power split device 3.

Battery unit 40A is connected to power supply line PL1A and ground line SL. Battery unit 40A includes a large-capacity battery BA for power storage, a system main relay SMR3 connected between the negative electrode of battery BA and ground line SL, a system main relay SMR2 connected between the positive electrode of battery BA and power supply line PL1A, and a system main relay SMR1 and a current-limiting resistor R connected in series to each other and connected in parallel to system main relay SMR2. System main relays SMR1-SMR3 have the conducting/non-conducting states controlled in response to control signals CONT1-CONT3, respectively, provided from control device 30.

Battery unit 40A further includes a voltage sensor 10A measuring a voltage VA between the terminals of battery BA, and a current sensor 11A sensing a current IA flowing through battery BA. For example, a secondary battery, such as a lead-acid battery, a nickel-hydride battery or a lithium-ion battery can be used as battery BA.

Battery unit 40B is connected to power supply line PL1B and ground line SL. Battery unit 40B includes a battery BB, a system main relay SMR5 connected between the negative electrode of battery BB and ground line SL, and a system main relay SMR4 connected between the positive electrode of battery BB and power supply line PL1B. System main relays SMR4 and SMR5 have the conducting/non-conducting states controlled in response to control signals CONT4 and CONT5, respectively, provided from control device 30.

Battery unit 40B further includes a voltage sensor 10B measuring a voltage VB between the terminals of battery BB, and a current sensor 11B sensing a current IB flowing through battery BB. A battery different from battery BA in terms of properties and capacity, for example, a secondary battery such as a lead-acid battery, a nickel-hydride battery or a lithium-ion battery can be used as battery BB.

Boost converter 12A includes a reactor L1A having one end connected to power supply line PL1A, IGBT elements Q1A and Q2A connected in series between a power supply line PL2 and ground line SL, and diodes D1A and D2A connected, respectively, in parallel to IGBT elements Q1A and Q2A.

Reactor L1A has the other end connected to an emitter of IGBT element Q1A and a collector of IGBT element Q2A. Diode D1A has a cathode connected to a collector of IGBT element Q1A and an anode connected to the emitter of IGBT element Q1A. Diode D2A has a cathode connected to the collector of IGBT element Q2A and an anode connected to an emitter of IGBT element Q2A.

Boost converter 12B includes a reactor L1B having one end connected to power supply line PL1B, IGBT elements Q1B and Q2B connected in series between power supply line PL2 and ground line SL, and diodes D1B and D2B connected, respectively, in parallel to IGBT elements Q1B and Q2B.

Reactor L1B has the other end connected to an emitter of IGBT element Q1B and a collector of IGBT element Q2B. Diode D1B has a cathode connected to a collector of IGBT element Q1B and an anode connected to the emitter of IGBT element Q1B. Diode D2B has a cathode connected to the collector of IGBT element Q2B and an anode connected to an emitter of IGBT element Q2B.

Inverter 14 receives the boosted voltage from boost converters 12A and 12B, and drives motor generator MG1, for example, to start up engine 4. Furthermore, inverter 14 returns electric power generated at motor generator MG1 by motive power transmitted from engine 4 back to boost converters 12A and 12B. Here, boost converters 12A and 12B are controlled by control device 30 to operate as step-down circuits.

Inverter 14 includes a U-phase arm 15, a V-phase arm 16 and a W-phase arm 17. U-phase arm 15, V-phase arm 16 and W-phase arm 17 are connected in parallel between power supply line PL2 and ground line SL.

U-phase arm 15 includes IGBT elements Q3 and Q4 connected in series between power supply line PL2 and ground line SL, and diodes D3 and D4 connected, respectively, in parallel to IGBT elements Q3 and Q4. Diode D3 has a cathode connected to a collector of IGBT element Q3 and an anode connected to an emitter of IGBT element Q3. Diode D4 has a cathode connected to a collector of IGBT element Q4 and an anode connected to an emitter of IGBT element Q4.

V-phase arm 16 includes IGBT elements Q5 and Q6 connected in series between power supply line PL2 and ground line SL, and diodes D5 and D6 connected, respectively, in parallel to IGBT elements Q5 and Q6. Diode D5 has a cathode connected to a collector of IGBT element Q5 and an anode connected to an emitter of IGBT element Q5. Diode D6 has a cathode connected to a collector of IGBT element Q6 and an anode connected to an emitter of IGBT element Q6.

W-phase arm 17 includes IGBT elements Q7 and Q8 connected in series between power supply line PL2 and ground line SL, and diodes D7 and D8 connected, respectively, in parallel to IGBT elements Q7 and Q8. Diode D7 has a cathode connected to a collector of IGBT element Q7 and an anode connected to an emitter of IGBT element Q7. Diode D8 has a cathode connected to a collector of IGBT element Q8 and an anode connected to an emitter of IGBT element Q8.

An intermediate point of the arm of each phase is connected to each end of a coil of each phase of motor generator MG1. In other words, motor generator MG1 is a three-phase permanent magnet synchronous motor, and three coils of the U, V and W-phases have respective one ends connected to a midpoint in common. The U-phase coil has the other end connected to a connection node of IGBT elements Q3 and Q4. The V-phase coil has the other end connected to a connection node of IGBT elements Q5 and Q6. The W-phase coil has the other end connected to a connection node of IGBT elements Q7 and Q8.

Current sensor 24 detects a current flowing to motor generator MG1 as a motor current value MCRT1 and outputs motor current value MCRT1 to control device 30.

Inverter 22 is connected to power supply line PL2 and ground line SL. Inverter 22 converts a DC voltage output from boost converters 12A and 12B into a three-phase AC and outputs the converted AC to motor generator MG2 that drives wheels 2. Furthermore, inverter 22 returns electric power generated at motor generator MG2 back to boost converters 12A and 12B during regenerative braking. Here, boost converters 12A and 12B are controlled by control device 30 to operate as step-down circuits. Although an internal configuration of inverter 22 is not shown, it is the same as that of inverter 14 and the detailed description thereof will not be repeated.

Control device 30 receives torque command values TR1 and TR2, the rotation speed of motors MRN1 and MRN2, each value of voltages VA, VB and VH and a current IA and IB, motor current values MCRT1 and MCRT2, and a startup signal IGON. Control device 30 outputs to boost converter 12B a control signal PWUB providing a boost instruction, a control signal PWDB providing a step-down instruction, and a signal CSDN providing an instruction for prohibiting an operation.

In addition, control device 30 outputs to inverter 14 a drive instruction PWMI1 for converting a DC voltage that is an output of boost converters 12A and 12B into an AC voltage for driving motor generator MG1, and a regeneration instruction PWMC1 for converting an AC voltage generated at motor generator MG1 into a DC voltage and returning the converted voltage back towards boost converters 12A and 12B.

Similarly, control device 30 outputs to inverter 22 a drive instruction PWMI2 for converting a DC voltage into an AC voltage for driving motor generator MG2, and a regeneration instruction PWMC2 for converting an AC voltage generated at motor generator MG2 into a DC voltage and returning the converted voltage back towards boost converters 12A and 12B.

Figure 2:
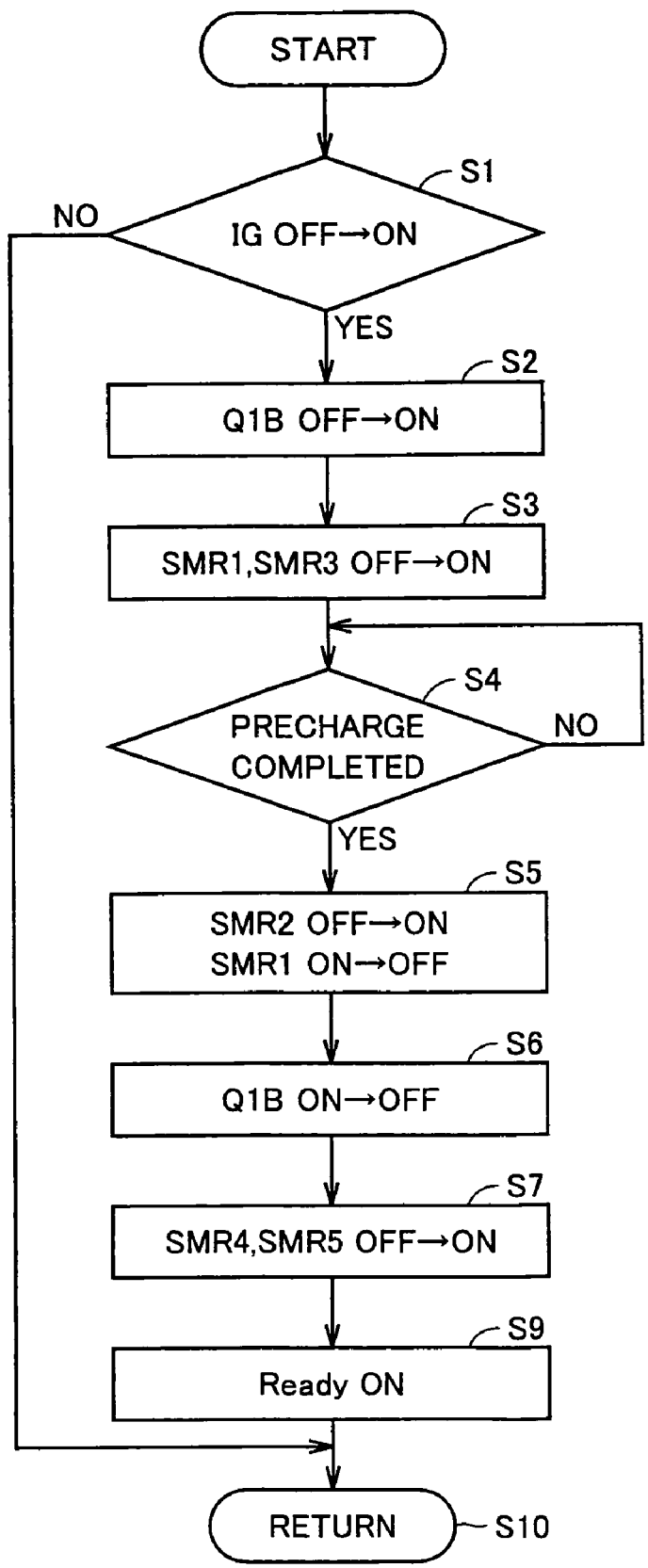
FIG. 2 is a flowchart for describing control by a control device 30 at the time of startup of a power supply system.

FIG. 2 is a flowchart for describing control by control device 30 at the time of startup of a power supply system. A process in this flowchart is invoked from a prescribed main routine and executed whenever a certain period of time has elapsed or whenever a prescribed condition is satisfied.

Figure 3:
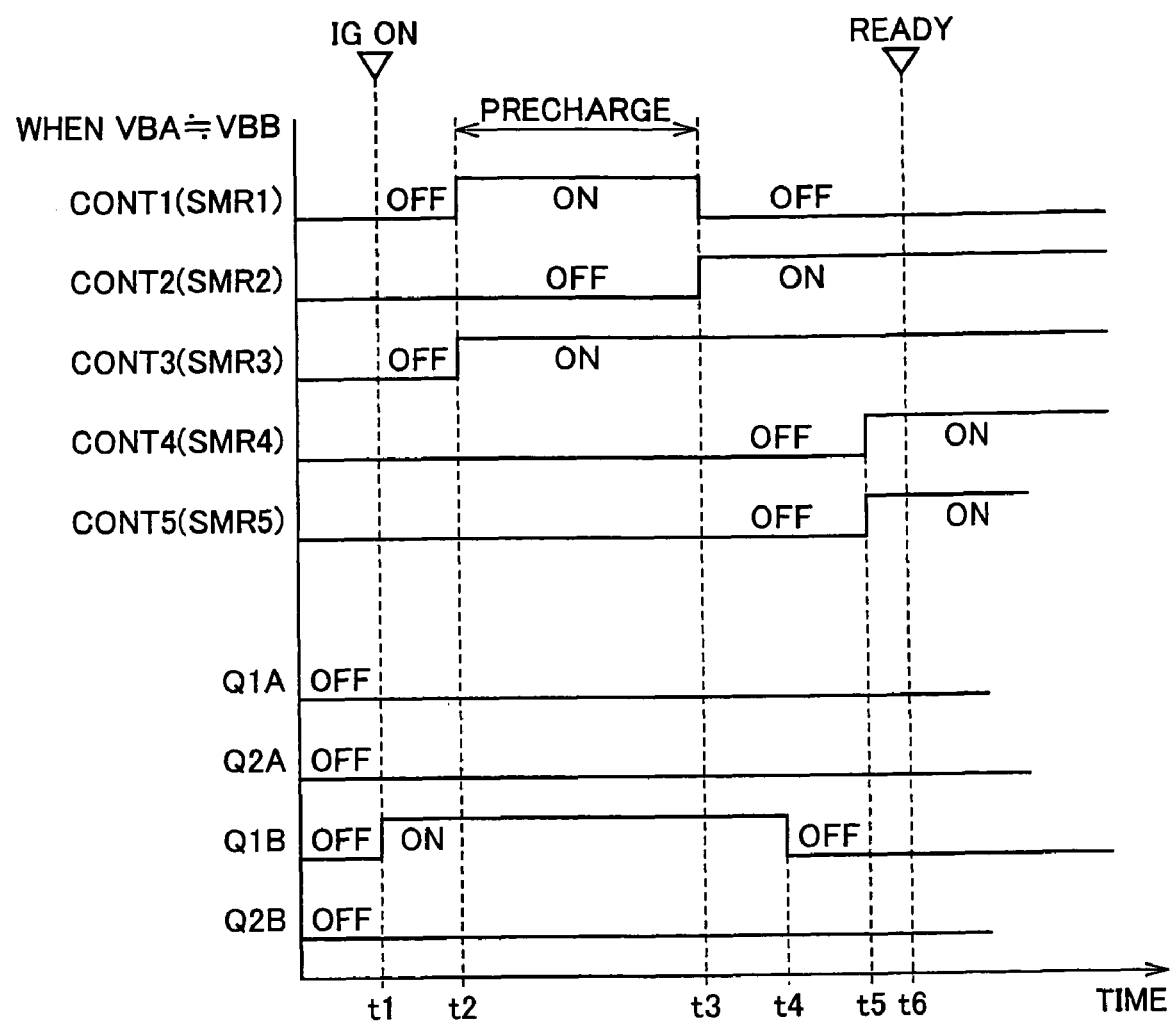
FIG. 3 is an operational waveform diagram of an example of an operation carried out based on the flowchart in FIG. 2.

FIG. 3 is an operational waveform diagram of an example of an operation carried out based on the flowchart in FIG. 2. This operation is carried out, for example, in a combination of batteries where a power supply voltage VBA of battery BA is approximately equal to a power supply voltage VBB of battery BB.

Referring to FIGS. 1 and 2, in a step S1, control device 30 first determines whether startup signal IGON is turned from the off state to the on state. If startup signal IGON is not turned from off to on, processing proceeds to a step S10 and control is moved to the main routine.

In step S1, if it is detected that startup signal IGON is turned from the off state to the on state, processing proceeds to a step S2.

In step S2, the signal provided to a gate is controlled such that IGBT element Q1B is turned from the off state to the on state. As a result, as shown at a time t1 in FIG. 3, IGBT element Q1B is turned from the off state to the on state.

Then, in a step S3, control device 30 renders control signals CONT1 and CONT3 active such that system main relays SMR1 and SMR3 are turned from the off state to the on state. In the waveform diagram of FIG. 3, at a time t2, system main relays SMR1 and SMR3 are turned from the off state to the on state, and precharging of capacitors C1, C2 and CH is initiated.

This precharging is performed employing the electric power of battery BA. In the power supply apparatus for a vehicle, when the vehicle is parked and the power supply system is off, the engine and motor generator MG1 also stop. Therefore, the precharging cannot be performed by electric power generated at motor generator MG1. This is significantly different from the art disclosed in Japanese Patent Laying-Open No. 2002-10502.

Thereafter, this state is maintained until the precharging is completed in a step S4. Completion of the precharging may be determined from the elapse of time obtained empirically as the time required for the precharging, or it may be detected from voltages of capacitors C1, C2 and CH and/or an accumulated value of a current flowing out of battery BA.

When it is determined that the precharging is completed in step S4, in a step S5, control device 30 renders control signal CONT2 active such that system main relay SMR2 is turned from the off state to the on state, and renders control signal CONT1 inactive such that system main relay SMR1 is turned from the on state to the off state. In the waveform diagram of FIG. 3, at a time t3, system main relay SMR1 is turned from the on state to the off state, and system main relay SMR2 is turned from the off state to the on state.

Following the completion of the processing in step S5, in a step S6, control device 30 renders a gate signal inactive such that IGBT element Q1B is turned from the on state to the off state. In FIG. 3, at a time t4, IGBT element Q1B is turned from the on state to the off state. At this stage, capacitor C2 is precharged and voltage VLB is increased to be substantially equal to voltage VBB. Therefore, even if system main relays SMR4 and SMR5 are connected, an excessive inrush current is not generated and welding of the relays due to discharge sparks will not occur.

Therefore, in a following step S7, control device 30 renders both control signals CONT4 and CONT5 active such that system main relays SMR4 and SMR5 are turned from the off state to the on state. In the waveform diagram of FIG. 3, at a time t5, system main relays SMR4 and SMR5 are both turned from the off state to the on state.

Thereafter, in a step S9, a ReadyOn indicator at the driver's seat is turned on, and in a step S10, the control is returned back to the main routine. In FIG. 3, these processing are performed at a time t6.

Referring again to FIG. 1, characteristics of the first embodiment will now be summarized.

The power supply apparatus for vehicle 100 includes battery BA, power supply line PL2 for feeding inverters 14 and 22 that drive motor generators MG1 and MG2, and boost converter 12A provided on a path connecting battery BA and power supply line PL2 for converting a voltage. The power supply apparatus for vehicle 100 further includes battery BB, boost converter 12B provided between battery BB and power supply line PL2 for converting a voltage, system main relay SMR4 provided between battery BB and boost converter 12B and serving as a connecting portion that switches between an electrically connected state and a disconnected state, capacitor C2 coupled to a path connecting the connecting portion and boost converter 12B, and control device 30 controlling boost converters 12A and 12B as well as the connecting portion. Upon receiving startup instruction IGON, control device 30 controls boost converter 12A such that electric power is supplied from battery BA to power supply line PL2 and capacitor CH is charged, and controls boost converter 12B such that capacitor C2 is charged from power supply line PL2. After the charging of capacitor C2 is completed, control device 30 switches system main relay SMR4 from the disconnected state to the connected state.

This prevents the flow of an excessive current when system main relay SMR4 is connected. Therefore, a resistor limiting a current in parallel to system main relay SMR4 and another system main relay for connecting the resistor do not have to be provided.

Preferably, the power supply apparatus for vehicle 100 further includes system main relay SMR1 provided on a path connecting battery BA and boost converter 12A, resistor R limiting a current and connected in series to system main relay SMR1, and system main relay SMR2 provided in parallel to system main relay SMR1 and resistor R that are connected in series. Upon receiving startup instruction IGON, control device 30 causes system main relay SMR1 to be brought into conduction and capacitor C2 to be charged, and then switches system main relays SMR2 and SMR4 from a non-conducting state to a conducting state.

As a result, when the system stops, the positive electrode sides of the batteries having high voltages are completely separated from the boost converters and the inverters. Therefore, safety when the vehicle is left for a long time such as at the time of parking or when vehicle maintenance is carried out is improved.

Preferably, the power supply apparatus for vehicle 100 further includes system main relay SMR1 provided between the positive electrode of battery BA and boost converter 12A, resistor R serving as a current-limiting element and connected in series to system main relay SMR1, system main relay SMR2 provided in parallel to system main relay SMR1 and resistor R that are connected in series, and system main relay SMR3 provided between the negative electrode of battery BA and boost converter 12A. In this case, the connecting portion includes two relays, namely, system main relay SMR4 provided between the positive electrode of battery BB and boost converter 12B, and system main relay SMR5 provided between the negative electrode of battery BB and boost converter 12B.

According to this configuration, in addition to the positive electrode sides of the batteries having high voltages, the negative electrode sides of the batteries are also completely separated from the boost converters and the inverters when the system stops. Therefore, safety when the vehicle is left for a long time such as at the time of parking or when vehicle maintenance is carried out is further improved.

By the control in the above-described manner, circuit elements corresponding to resistor R serving as the current-limiting element and system main relay SMR1 that causes a current to be flown through resistor R need not to be provided at the battery BB side unlike the battery BA side. Therefore, a circuit configuration is simplified and manufacturing costs can be reduced.

Modification of First Embodiment

Figure 4:
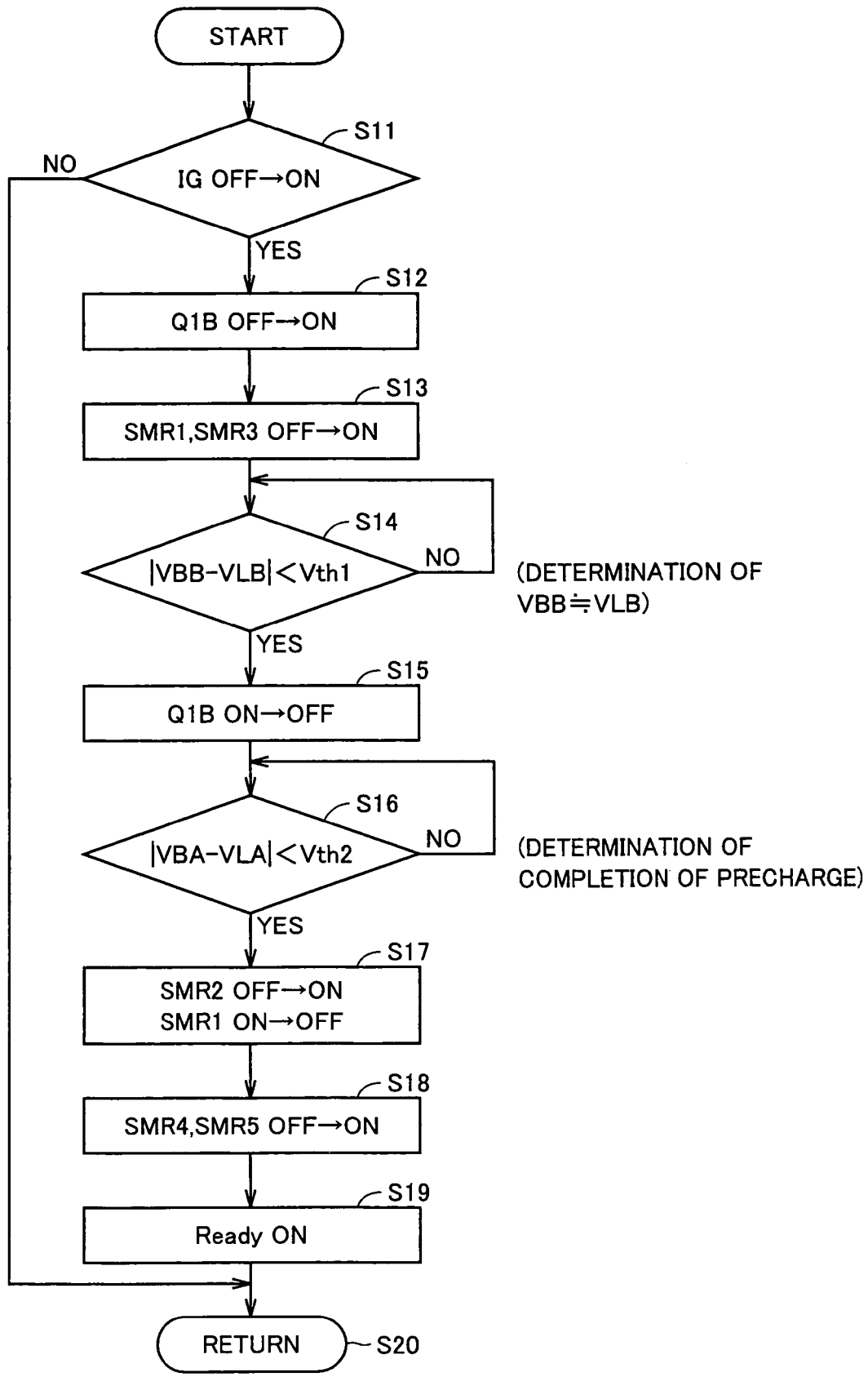
FIG. 4 is a modification of the flowchart in FIG. 2.

FIG. 4 is a modification of the flowchart in FIG. 2. A process in this flowchart is invoked from a prescribed main routine and executed whenever a certain period of time has elapsed or whenever a prescribed condition is satisfied.

Figure 5:
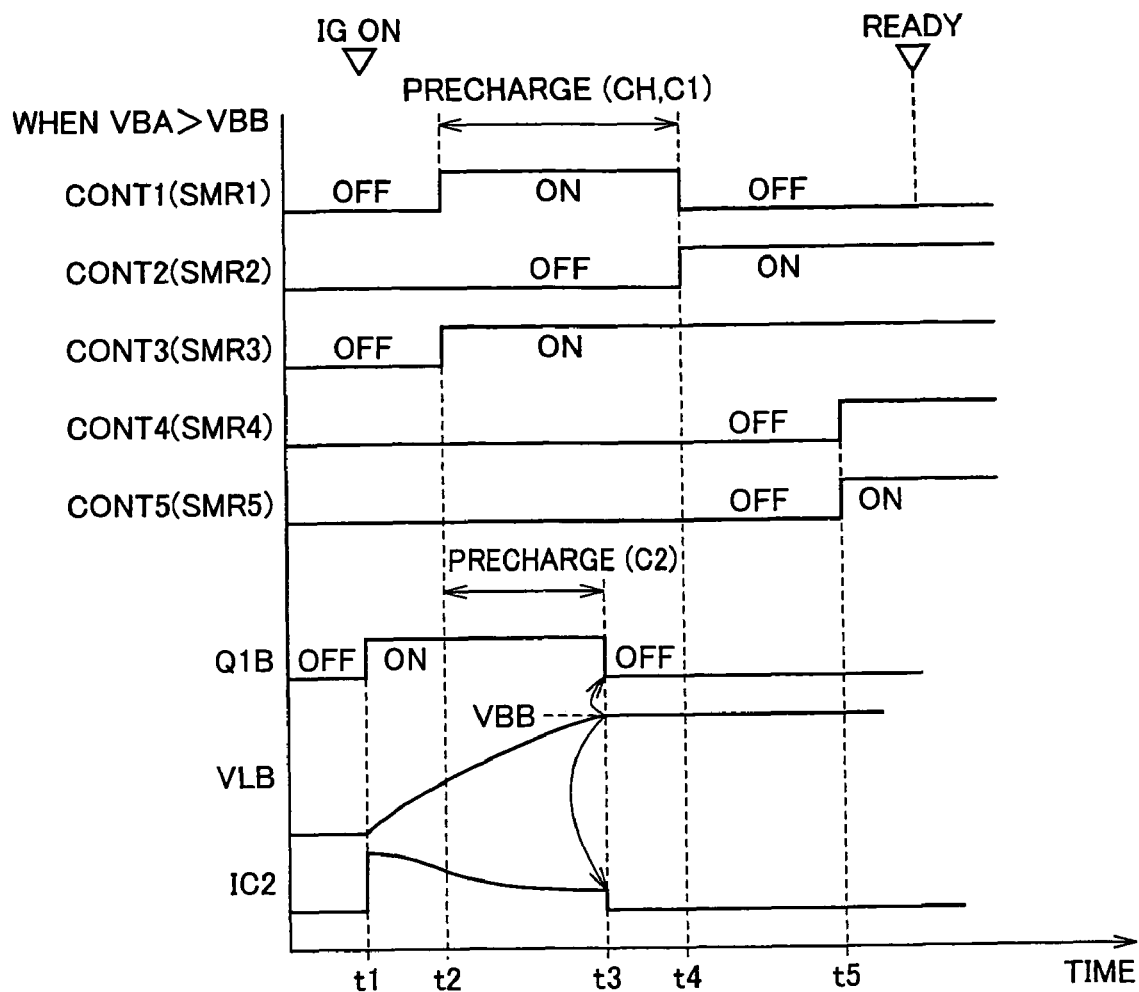
FIG. 5 is an operational waveform diagram of an example of an operation carried out based on the flowchart in FIG. 4.

FIG. 5 is an operational waveform diagram of an example of an operation carried out based on the flowchart in FIG. 4.

This operation is carried out, for example, when power supply voltage VBA of battery BA is higher than power supply voltage VBB of battery BB.

Since processing of a step S11 to a step S13 in FIG. 4 are the same as those of step S1 to step S3 in FIG. 2, and the same operations as those in FIG. 3 are carried out until a time t2 in FIG. 5, the description thereof will not be repeated.

In a step S14 in FIG. 4, it is determined whether a difference between voltage VBB of battery BB and voltage VLB of capacitor C2 is smaller than a prescribed threshold value Vth1. Threshold value Vth1 is set in consideration of a potential difference at which connection of system main relays SMR4 and SMR5 is allowed. Instead of actual comparison based on voltages, it may be determined that a voltage of capacitor C2 approaches a voltage of battery BB by accumulating a current flowing into capacitor C2 using a current sensor 42. Alternatively, it may be determined that a voltage of capacitor C2 approaches a voltage of battery BB from the elapse of time obtained empirically as the time required for precharging of capacitor C2.

If the condition in step S14 is not satisfied, IGBT element Q1B is maintained in the on state and the precharging of capacitor C2 continues. If the condition in step S14 is satisfied, the processing proceeds to a step S15 and control device 30 turns IGBT element Q1B from the on state to the off state. As a result, the charging of capacitor C2 is interrupted. Therefore, the voltage of capacitor C2 is not further increased and capacitor C2 is maintained in the appropriate precharging state.

In the waveform diagram of FIG. 5, when voltage VLB approaches battery voltage VBB at a time t3, IGBT element Q1B is turned from the on state to the off state. As a result, a charging current IC2 becomes zero and a rise in voltage VLB stops.

Following the completion of the processing in step S15, in a step S16, it is determined whether a difference between battery voltage VBA and voltage VLA becomes smaller than a threshold value Vth2. Threshold value Vth2 is set in consideration of a potential difference at which connection of system main relay SMR2 is allowed. Instead of actual comparison based on voltages, it may be determined that voltages of capacitors C1 and CH approach a voltage of battery BA by accumulating a current flowing into capacitors C1 and CH using a current sensor 11A. Alternatively, it may be determined that voltages of capacitors C1 and CH approach a voltage of battery BA from the elapse of time obtained empirically as the time required for precharging of capacitors C1 and CH.

If the condition in step S16 is not satisfied, system main relay SMR1 is maintained in the on state and system main relay SMR2 is maintained in the off state. The precharging of capacitors C1 and CH continues.

If the condition in step S16 is satisfied, the processing proceeds to a step S17. Control device 30 turns system main relay SMR2 from the off state to the on state, and system main relay SMR1 from the on state to the off state. Since the precharging is completed, an excessive inrush current is not generated when system main relay SMR2 is connected, and welding of the relays is prevented. In FIG. 5, this processing is performed at a time t4.

Following step S17, processing of a step S18 is performed. Control device 30 renders both control signals CONT4 and CONT5 active such that system main relays SMR4 and SMR5 are turned from the off state to the on state. In the waveform diagram of FIG. 5, system main relays SMR4 and SMR5 are both turned from the off state to the on state at a time t5.

Thereafter, in a step S19, the ReadyOn indicator at the driver's seat is turned on, and in a step S20, the control is returned back to the main routine.

By the control in this manner, the present invention is applicable even if there is a voltage difference between a plurality of batteries.

Referring again to FIG. 1, added characteristics of the modification of the first embodiment will be summarized.

In other words, the power supply apparatus for vehicle 100 further includes current sensor 42 and voltage sensor 21B serving as sensors sensing a state of charge of capacitor C2. Control device 30 determines whether the charging of capacitor C2 is completed according to an output of any of the sensors.

According to other characteristics, the power supply apparatus for vehicle 100 further includes voltage sensor 10B sensing a voltage of battery BB and voltage sensor 21B sensing a charging voltage of capacitor C2. Control device 30 receives outputs of voltage sensors 10B and 21B, and prohibits switching of system main relay SMR4 to a connected state while a difference between the voltage of battery BB and the charging voltage of capacitor C2 is higher than a prescribed value. It should be noted that system main relay SMR5 may be controlled similarly in place of system main relay SMR4 or simultaneously with system main relay SMR4.

By thus controlling the boost converters, the present invention is applicable even if a plurality of batteries having different battery voltages are used, in other words, even if there is a voltage difference between battery BA and battery BB.

Second Embodiment

A power supply apparatus for a vehicle that will be described in a second embodiment is a power supply apparatus where two system main relays on the ground line side are integrated into one relay in the configuration of the power supply apparatus for a vehicle described in FIG. 1.

Figure 6:
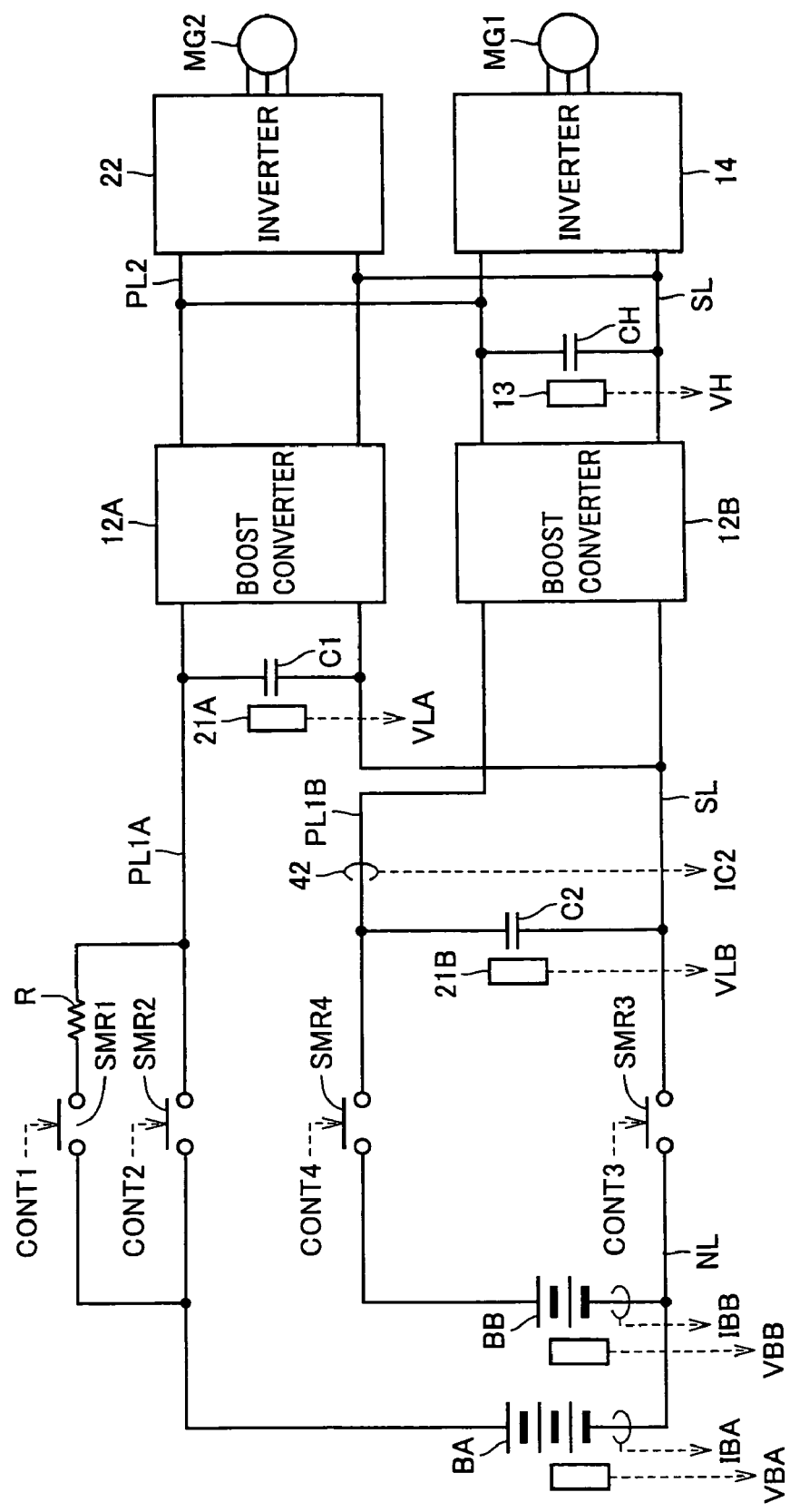
FIG. 6 is a schematic block diagram of a configuration of a vehicle 200 of a second embodiment.

FIG. 6 is a schematic block diagram of a configuration of a vehicle 200 of the second embodiment.

Referring to FIG. 6, the power supply apparatus for vehicle 200 includes battery BA, and boost converter 12A provided between battery BA and power supply line PL2 for converting a voltage. Inverters 14 and 22 are fed from power supply line PL2 and drive motor generators MG1 and MG2, respectively.

The power supply apparatus for vehicle 200 further includes battery BB, boost converter 12B provided between battery BB and power supply line PL2 for converting a voltage, system main relay SMR4 provided between battery BB and boost converter 12B and serving as the connecting portion that switches between an electrically connected state and a disconnected state, capacitor C2 coupled to a path connecting the connecting portion and boost converter 12B, and a control device not shown that controls boost converters 12A and 12B as well as the connecting portion.

The control device controls the boost converters in a manner substantially similar to that of control device 30 described in FIG. 1. Upon receiving startup instruction IGON, the control device controls boost converter 12A such that capacitor CH on power supply line PL2 is charged from battery BA, and controls boost converter 12B such that capacitor C2 is charged from power supply line PL2. After the charging of capacitor C2 is completed, the control device switches system main relay SMR4 from the disconnected state to the connected state.

The power supply apparatus for vehicle 200 further includes series-connected system main relay SMR1 and resistor R limiting a current, provided between battery BA and boost converter 12A, system main relay SMR2 provided in parallel to system main relay SMR1 and resistor R that are connected in series, and system main relay SMR3. Upon receiving startup instruction IGON, the control device causes system main relay SMR1 to be brought into conduction and capacitor C2 to be charged, and then switches system main relays SMR2 and SMR4 from a non-conducting state to a conducting state.

The negative electrode of battery BA and the negative electrode of battery BB are both electrically connected to a negative line NL. Boost converter 12A and boost converter 12B are both connected to ground line SL. The power supply apparatus for vehicle 200 further includes system main relay SMR3 provided between negative line NL and ground line SL. In FIG. 6, only one system main relay SMR4 provided between the positive electrode of battery BB and boost converter 12B corresponds to the "connecting portion."

Figure 7:
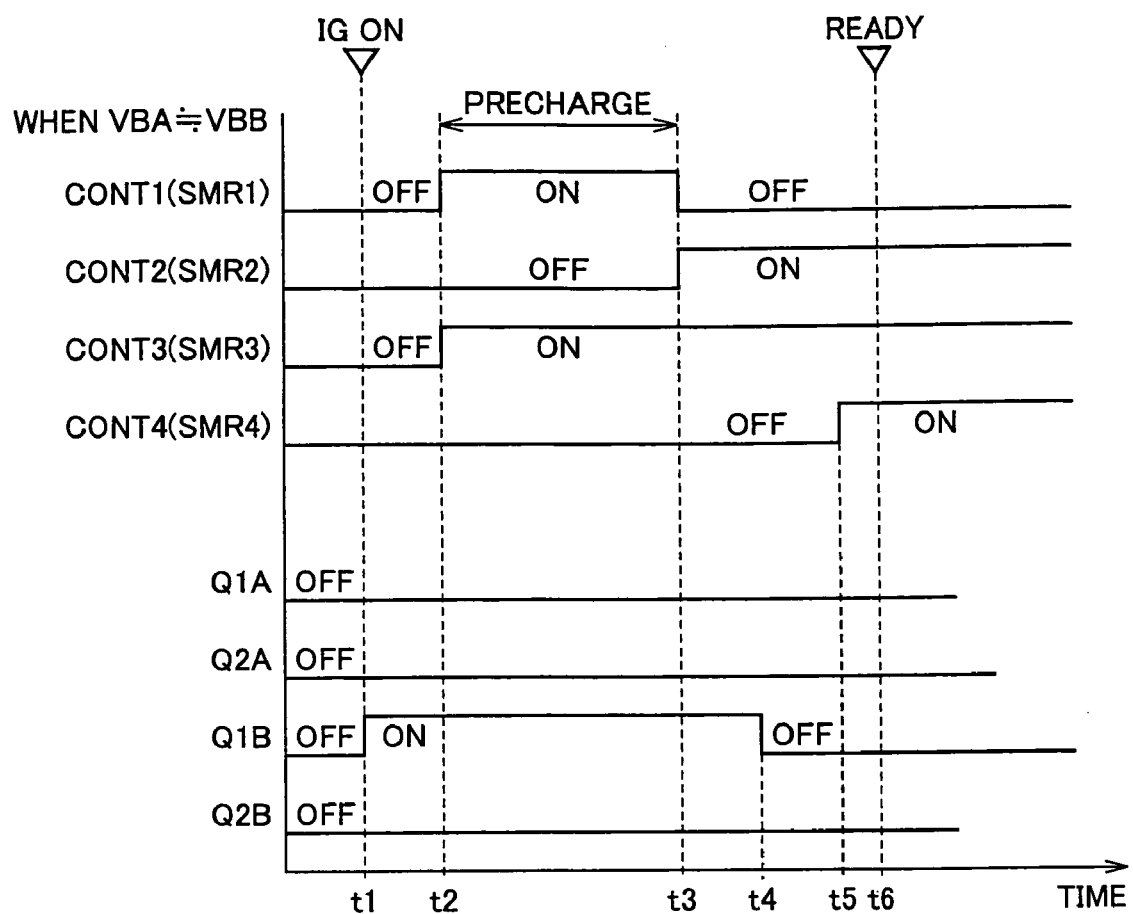
FIG. 7 is a first operational waveform diagram illustrating an example of an operation in the second embodiment.

FIG. 7 is a first operational waveform diagram illustrating an example of an operation in the second embodiment.

In the waveform diagram of FIG. 7, system main relay SMR5 is integrated with system main relay SMR3 in an example of the case where there is little difference between battery voltage VA and battery voltage VB in the first embodiment shown in FIG. 3. Therefore, since the waveform diagram of FIG. 7 corresponds to that described in the first embodiment with the exception that a waveform of system main relay SMR5 is not given, the description thereof will not be repeated.

Figure 8:
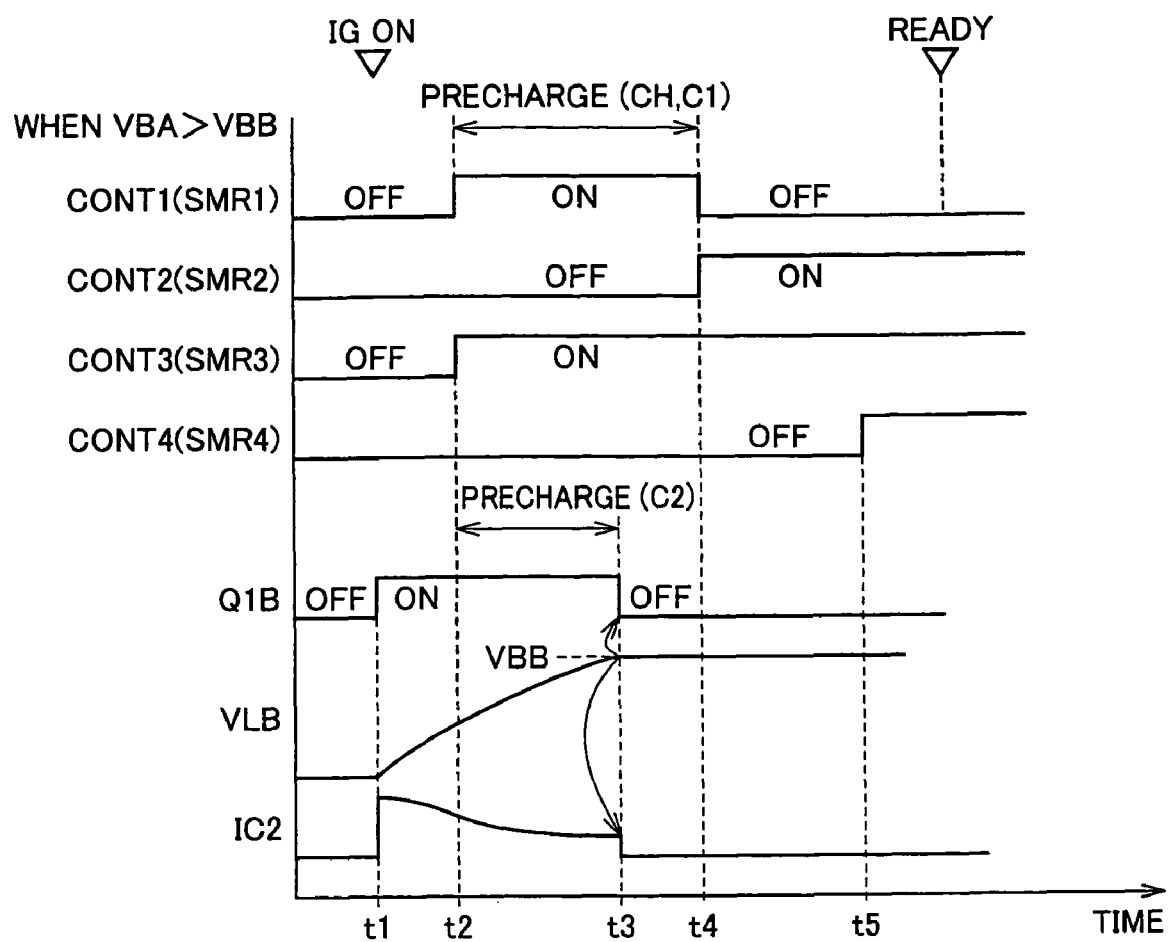
FIG. 8 is a second operational waveform diagram illustrating an example of an operation in the second embodiment.

FIG. 8 is a second operational waveform diagram illustrating an example of an operation in the second embodiment.

In the waveform diagram of FIG. 8, system main relay SMR5 is integrated with system main relay SMR3 in an example of the case where battery voltage VA is higher than battery voltage VB in the first embodiment shown in FIG. 5. Therefore, since the waveform diagram of FIG. 8 corresponds to that described in the first embodiment with the exception that a waveform of system main relay SMR5 is not given, the description thereof will not be repeated.

In the power supply apparatus for a vehicle described in the second embodiment, the number of the system main relays can further be reduced as compared to the number in the configuration of the first embodiment. Therefore, the number of the components can be reduced to lower the manufacturing costs.

The present embodiment has been described based on an example in which the present invention is applied to a series/parallel-type hybrid system in which the power of the engine is split by the power split device to be transmitted to an axle and a generator. The present invention, however, can also be applied to a series-type hybrid vehicle using an engine only for the purpose of driving a generator and generating the driving force of an axle only by a motor that employs the electric power generated by the generator. The present invention is also applicable to an electric vehicle and a fuel cell vehicle.

It should be understood that the embodiments disclosed herein are illustrative and not limitative in any respect. The scope of the present invention is defined by the terms of the claims, rather than the description above, and is intended to include any modifications within the scope and meaning equivalent to the terms of the claims.

The invention claimed is:

1. A power supply apparatus for a vehicle, comprising:
a first power storage device;
a power supply line for feeding an inverter that drives a motor;
a first voltage converter provided between said first power storage device and said power supply line for converting a voltage;
a second power storage device;
a second voltage converter provided between said second power storage device and said power supply line for converting a voltage;
a connecting portion provided between said second power storage device and said second voltage converter for switching between an electrically connected state and a disconnected state;
a capacitor coupled to a path connecting said connecting portion and said second voltage converter; and
a control device controlling said first and second voltage converters and said connecting portion,
upon receiving a startup instruction, said control device controlling said first voltage converter such that electric power is supplied from said first power storage device to said power supply line, and controlling said second voltage converter such that said capacitor is charged from said power supply line, and after charging of said capacitor is completed, said control device switching said connecting portion from said disconnected state to said connected state.

2. The power supply apparatus for a vehicle according to claim 1, further comprising a sensor sensing a state of charge of said capacitor,
wherein said control device determines whether charging of said capacitor is completed according to an output of said sensor.

3. The power supply apparatus for a vehicle according to claim 1, further comprising:
a first voltage sensor sensing a voltage of said second power storage device; and
a second voltage sensor sensing a charging voltage of said capacitor,
wherein said control device receives outputs of said first and second voltage sensors and prohibits switching of said connecting portion to a connected state while a difference between a voltage of said second power storage device and a charging voltage of said capacitor is higher than a prescribed value.

4. The power supply apparatus for a vehicle according to claim 1, further comprising:
a first relay provided between said first power storage device and said first voltage converter;
a current-limiting element connected in series to said first relay; and
a second relay provided in parallel to said first relay and said current-limiting element that are connected in series, wherein
said connecting portion includes
a third relay, and
upon receiving said startup instruction, said control device causes the first relay to be brought into conduction and said capacitor to be charged, and then switches said second and third relays from a non-conducting state to a conducting state.

5. The power supply apparatus for a vehicle according to claim 1, further comprising:
a first positive relay provided between a positive electrode of said first power storage device and said first voltage converter;
a current-limiting element connected in series to said first positive relay;

a second positive relay provided in parallel to said first positive relay and said current-limiting element that are connected in series; and a first negative relay provided between a negative electrode of said first power storage device and said first voltage converter, wherein said connecting portion includes a third positive relay provided between a positive electrode of said second power storage device and said second voltage converter, and a second negative relay provided between a negative electrode of said second power storage device and said second voltage converter.

6. The power supply apparatus for a vehicle according to claim 1, further comprising:

a negative line to which a negative electrode of said first power storage device and a negative electrode of said second power storage device are both connected;

a ground line to which said first voltage converter and said second voltage converter are both connected;

a negative relay provided between said negative line and said ground line;

a first positive relay provided between a positive electrode of said first power storage device and said first voltage converter;

a current-limiting element connected in series to said first positive relay; and a second positive relay provided in parallel to said first positive relay and said current-limiting element that are connected in series, wherein said connecting portion includes a third positive relay provided between a positive electrode of said second power storage device and said second voltage converter.

7. A vehicle incorporating the power supply apparatus according to claim 1.

8. A vehicle incorporating the power supply apparatus according to claim 2.

9. A vehicle incorporating the power supply apparatus according to claim 3.

10. A vehicle incorporating the power supply apparatus according to claim 4.

11. A vehicle incorporating the power supply apparatus according to claim 5.

12. A vehicle incorporating the power supply apparatus according to claim 6.

* * * * *